$K = \dfrac{L_M}{L_0}$

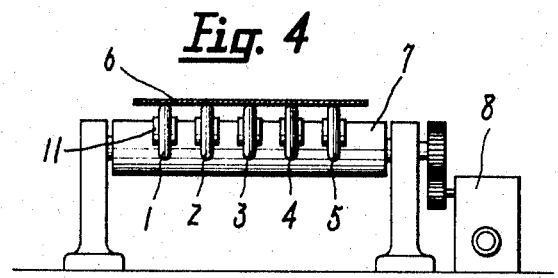
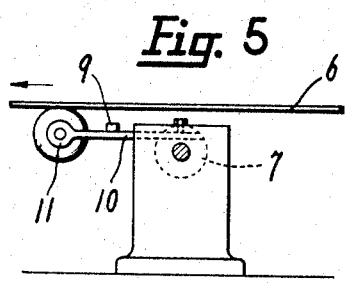
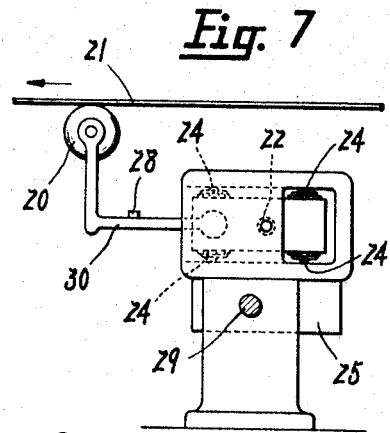
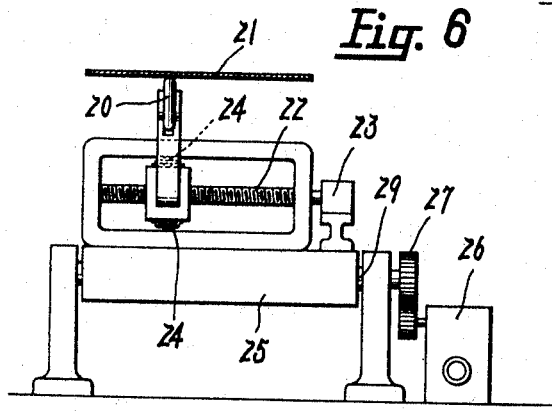

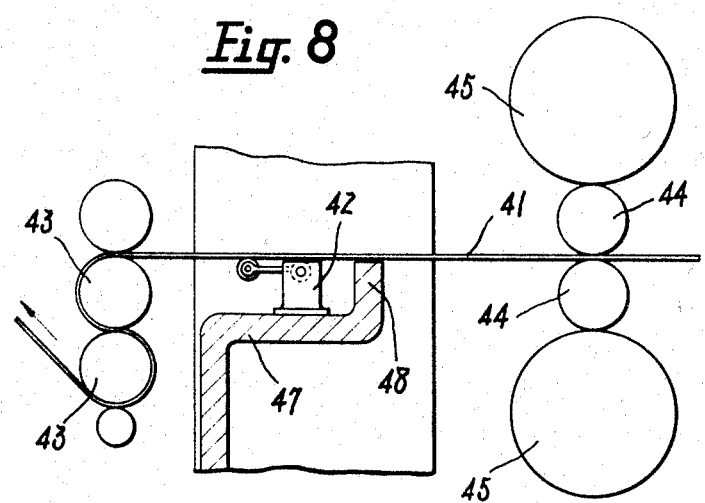
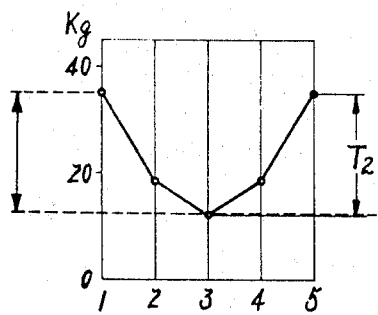
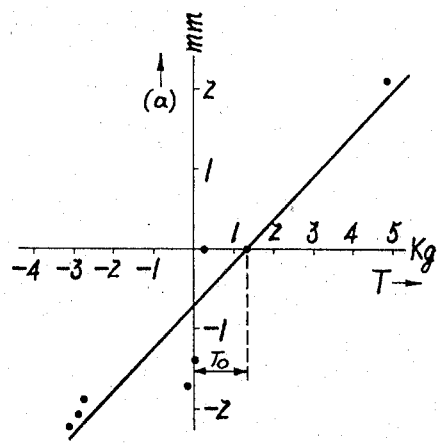

United States Patent Office 3,442,104
Patented May 6, 1969

3,442,104
CONTROLLING METHOD AND MEASURING
INSTRUMENT FOR THE FLATNESS OF
STRIPS
Yoshisuke Misaka, Nishinomiya, Kakunosuke Yamamori, Masahiro Machida, and Michio Nakata, Wakayama, Japan, assignors to Sumito Metal Industries Limited, Osaka, Japan
Filed Jan. 25, 1966, Ser. No. 522,865
Claims priority, application Japan, Jan. 30, 1965, 40/5,262
Int. Cl. B21b 37/12, 37/00, 37/04
U.S. Cl. 72—9          4 Claims

ABSTRACT OF THE DISCLOSURE

A method for correcting roll contour by guiding a strip under tension between two sets of fixed rolls, providing contactors at three points on the strip, i.e. portions near the center part and both edges across the strip to measure the tension at each said portions and providing a control input signal for a roll contour control system by a deviation in the measured values at the center part and both edges of the strip, whereby a metal strip of favorable flatness can automatically be obtained and an instrument for carrying out the above method.

This invention relates to measuring the degree of flatness of strip being rolled, to methods of controlling the flatness of strip being rolled by giving instructions to an already existing work roll contour control system on the basis of such measured signals and to flatness measuring instruments.

In rolling strip, it is a very important but considerably difficult problem to produce strip high in flatness. In order that a strip high in flatness may be obtained, the reduction in every point from one edge to the other must be constant. Unless such reduction is kept constant, the strip will elongate so nonuniformly from one edge to the other that, in case a sheet made of the strip is placed on a surface plate, such distortions as are generally called wave edge by the greater reduction on the edge of the sheet or center buckle by the greater reduction is the central part of the sheet will be made and no sheet high in flatness will be obtained.

In order to keep the reduction in every point of strip from one edge to the other constant, it is necessary to know the rolling load, to determine thereby the deflection of the work roll and to give a contour to the work roll to compensate the deflection in advance. However, the thermal expansion of the roll by the heat energy produced during the rolling will be so nonuniform in the roll barrel and the profile of the hot band will vary so quickly that, with only the contour given to the work roll in advance, no strip high in flatness will be rolled and therefore the contour of the work roll will have to be changed from time to time.

Therefore, various work roll contour control systems have been already invented. Some of them have been practiced. One of them is to provide oil pressure cylinders between the chocks of top and bottom work roll so that a deflection may be given to the work roll by applying an oil pressure and the most suitable roll contour may be obtained by properly adjusting the oil pressure. However, even if such work roll contour control system is used for the automatic or manual operation, the criterion of the operation should be still the shape of the rolled strip. Unless the shape of the strip, that is, the wave edge and the center buckles are actually measured or the amounts of variations are continuously measured and are corrected from time to time during rolling, no proper strip will be able to be obtained.

There is no other way of judging the properness of the shape of a strip being rolled than with the naked eyes. There has long been expected the appearance of a method and instrument for measuring it quantitatively or qualitatively.

An object of the present invention is to quantitatively or qualitatively measure wave edge and center buckle of strip with a mechanical-electrical method of a low cost and a high precision and to quantitatively or qualitatively watch the shapes of the strip being rolled.

A second object of the present invention is to convert to electric signals the shapes of strip varying from time to time during rolling with an instrument of a low cost and a high precision and easy to maintain.

A third object of the present invention is to provide strip of a constantly uniform flatness by continuously adjusting the bending of the work roll in an automatic or manual operation by giving distortion measuring signals in rolling as obtained by the above mentioned method and instrument as instructing signals for an already existing work roll contour control system.

In the accompanying drawings;

FIGURE 4 is an elevation of a flatness measuring instrument based on an embodiment of the present invention.

FIGURE 5 is a side view of FIGURE 4.

FIGURE 6 is an elevation of a flatness measuring instrument based on another embodiment of the present invention.

FIGURE 7 is a side view of FIGURE 6.

FIGURE 8 is an explanatory view of a flatness measuring instrument as set on the outlet side of a cold skin pass mill and as seen from the side.

FIGURE 9 is a curve diagram showing a result measured with the embodiment in FIGURE 8 and shows the tension distribution of the strip.

FIGURE 10 is a curve diagram showing the relation between the measured value by the measuring instrument as obtained by the embodiment in FIGURE 8 and the flatness of the strip as actually obtained on a surface plate.

First of all, the principle of the flatness measuring method shall be explained. It shall be explained that the flatness of a strip being rolled can be measured by measuring the tension of the strip from one edge to the other.

When a strip high in flatness is pulled lengthwise, the tension distribution across the strip will be uniform.

On the contrary, in case the flatness is low, the tension of the strip from one edge to the other will not be uniform and a specific tension distribution will be shown. For example, in the case of extreme wave edges, there will be no tension in the rolling direction on the edges. It is therefore understood that a method of judging the flatness is to measure the tension distribution of the strip. In principle, it is good to so operate the rolling mill that the tension distribution across the strip may be always uniform.

Figure 1:
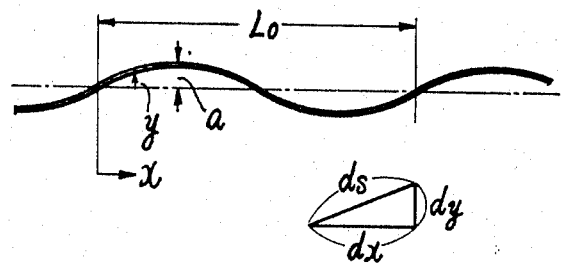
FIGURES 1 and 2 are explanatory views for mathematically and theoretically analyzing the forms of strip waves.
Figure 2:
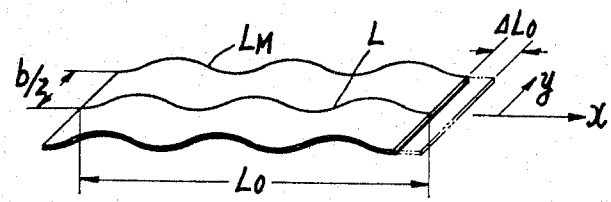

Now, if the waviness of the edge of a strip is made to approximate such sine wave form as is shown in FIGURE 1 and is represented by $$y=a\left(\sin\frac{2\pi}{L_o}\cdot x\right) \quad (1)$$

the increments of the respective parts are taken as $d_s$, $d_y$ and $d_x$ and $d_s$ is determined, it will be $$d_s=\sqrt{(dx)^2+(dy)^2} \quad (2)$$

$$=m\sqrt{1-k^2\sin^2\varphi}\cdot d\varphi \quad (3)$$

wherein $$m=\left(\frac{L_o}{2\pi}\right)^2+a^2 \quad (4)$$

$$k^2=\frac{\left(\frac{2\pi a}{L_o}\right)^2}{1+\left(\frac{2\pi a}{L_o}\right)^2} \quad (5)$$

$$\varphi=\frac{2\pi}{L_o}\cdot x \quad (6)$$

The length $L_M$ along the waviness of the pitch $L_c$ part will be $$L_M=4\int_0^{\pi/2}\cdot d_s=4m\int_0^{\pi/2}\sqrt{1-k^2\sin^2\varphi}\,d\varphi \quad (7)$$

$$=4m\cdot E\left(\frac{\pi}{2}\cdot k\right) \quad (8)$$

wherein $$E\left(\frac{\pi}{2}\cdot k\right)=\int_0^{2/\pi}\sqrt{1-k^2\sin^2\varphi}\,d\varphi \quad (9)$$

From the formula of the elliptic integral, it will be $$L_M=2\pi\cdot m\left\{1-\left(\frac{1}{2}\right)^2\frac{k^2}{1}-\left(\frac{1}{2}\frac{3}{4}\right)^2,\frac{k^4}{3}\cdots\right\} \quad (10)$$

Further, if the ratio of the length $L_M$ along the waviness of the pitch $L_o$ part to the pitch $L_o$ is taken as K, as $L_o\gg a$, $$k^2=\left(\frac{2\pi a}{L_o}\right)^2$$

wherein $$K=\frac{L_M}{L_o} \quad (11)$$

$$=\sqrt{1+\left(\frac{2\pi a}{L_o}\right)}\left\{1-\frac{1}{4}\left(\frac{2\pi a}{L_o}\right)-\frac{3}{64}\left(\frac{2\pi a}{L_o}\right)^4\right\} \quad (12)$$

Figure 3:
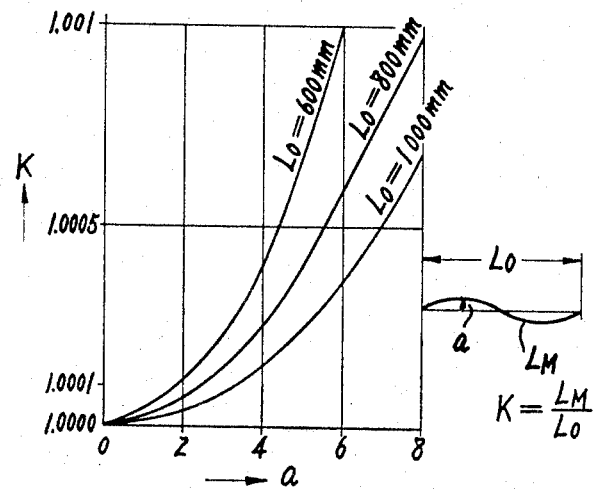
FIGURE 3 shows relative curves of the pitches and heights of waves and the elongations represented by mathematical analyses.

Thus the relations of $L_o$, $a$ and K will be as shown in FIGURE 3.

Then, the tension in case a strip in which wave edge are present is pulled shall be investigated.

In case a tension is given to a strip of a length $L_o$ and a length $L_M$ along the wave edge and the strip is elongated by $\Delta L_o$, the tensile stress will be maximum in the central part and minimum on the edge. In case $\Delta L_o$ is smaller than $(L_M-L_o)$, the tension on the edge will be zero.

If the length along the wave in any position $y$ across the strip is L, the elongation in that part will be $$\epsilon=\frac{L_o-L+\Delta L_o}{L}\doteq\frac{L_o-L+\Delta L_o}{L_o} \quad (13)$$

If the variation from $L_o$ to $L_M$ is assumed to be parabolic, $$L=L_o\left\{1+\left(\frac{2}{b}\right)^2(K-1)y^2\right\} \quad (14)$$

$$K=\frac{L_M}{L_o} \quad (15)$$

The tension T for the elongation $\Delta L_o$ will be $$T=2\int_0^{b/2} h\cdot\sigma\, dy \quad (16)$$

wherein $h$ is the thickness of the strip and $\sigma$ is the tensile stress in the part $y$.

Here, if the modulus of elasticity E is substituted, $$T=h\cdot b\cdot E\cdot\left\{\frac{\Delta L_o}{L_o}-\frac{K-1}{3}\right\} \quad (17)$$

On the other hand, the condition for the wave edge to completely vanish is $$L_M-L_o=\Delta L_o$$

Therefore, $$\frac{\Delta L_o}{L_o}=K-1 \quad (18)$$

Thus, the total tension $T_o$ in case the wave edges vanish will be $$T_o=h\cdot b\cdot E\frac{2(K-1)}{3} \quad (19)$$

Here, if, for example, the strip width $b$ is 930 mm., the strip thickness $h$ is 1.0 mm., Young's modulus is $2.1\times10^4$ kg./mm.$^2$ and the tension $T_o$ is 2.000 kg., the limit flatness at which the wave edge vanish will be $$K-1=\frac{3T_o}{2h\cdot b\cdot E}$$

$$\therefore K=1.000154$$

If the condition corresponding to the value of K is determined, it will correspond to a strip of wave edge of, for example, $L_o=600$ mm. and $a=2.4$ mm. Reversely speaking, if a total tension of 2.000 kg. is applied to the strip of such wave edges, through the strip appears to be flat at a glance, the tension on the edge will be zero and, in the central part, $$\sigma m=E\cdot\epsilon m$$

$$=E\cdot\frac{\Delta L_o}{L_o}$$

$$=E(K-1)$$

$$3.15\ kg./mm.^2$$

That is to say, it is found that the tension distribution is present as varying from a tension of zero on the edge to a tension of 3.15 kg./mm.$^2$ in the central part. By measuring this tension distribution, it is possible to quantitatively (or qualitatively) determine the flatness of the strip.

Now, a flatness measuring instrument shall be explained. Needless to say, the flatness measuring instrument should be such as occupies the essential part of the present invention and equally satisfies the conditions that it (1) can measure the tension distribution positively at a high precision, (2) does not give any flaw or detrimental mark to the strip and (3) has a sufficient mechanical durability as a measuring instrument.

FIGURES 4 and 5 illustrate an embodiment of the flatness measuring instrument of the present invention. FIGURE 4 is an elevation and FIGURE 5 is a side view of the same. In the drawings, a series of rollers 1 to 5 are measuring contactors which can easily rotate to measure the flatness of strips. 6 is a strip being rolled under a tension. 7 is a shaft carrying the tension measuring contactors. 8 is a rotary driving mechanism for adjusting the positions of the series of flatness measuring contactors 1 to 5 so that the positions of the respective measuring contactors for the strip 6 and the pushing force between the contactor and the strip may be adjusted by rotating the shaft 7.

The series of measuring contactors 1 to 5 provided across the above mentioned strip must be of the same structure and the same dimensions and must be so assembled that the respective rotatable contactors may well conform to the objects of the present invention and that the horizontal fitting of the contactors may be in a very high precision. The strip as stretched by a tension at right angles to FIGURE 4 will pass on said series of measuring contactors.

The measuring contactors 1 to 5 are pulled up to proper positions by rotating the shaft 7 by driving the positioning system 8 for the above mentioned measuring contactors and are fixed by giving a proper bending stress to a lever 10 of each of the contactors. 9 is a wire strain gauge pasted to the above mentioned lever together with a dummy gauge. Each of the measuring contactors 1 to 5 is preferably a ring lined with a hard rubber or hard synthetic resin. The bearing part 11 is of a ball bearing system assembled in a high precision. As the measuring contactors 1 to 5 are set in several places (in five places in the illustration) across the strip, a load will act separately on each of them and will be electrically measured as a bending stress of the lever or a load on the contactor by the wire strain gauge 9 pasted to the lever 10 of the shaft 7 carrying the measuring contactors.

The strip being rolled is stretched by a tension but has generally a distribution of tensions as mentioned above.

In such distribution, when the strip is more reduced in the central part of the width so as to form center buckles, the tension will be low in the central part but will be high on the edges and, when the strip is more reduced on the edges so as to form wave edges, the tension will be low on the edges but will be high in the central part. As the tension distribution based on the above mentioned waviness is directly related with the load measured by the strain gauge 9 or the bending stress of the lever 10 of each of the contactors 1 to 5, the measured values of the contactors 1 to 5 by the present measuring instrument as they are will show the tension distribution across the strip and will form the flatness measuring parts of the strip.

FIGURES 6 and 7 illustrate another embodiment of the flatness measuring instrument used in the present invention.

FIGURE 6 is an elevation and FIGURE 7 is a side view of the same. In the drawings, 20 is a roller type contactor for measuring a tension distribution on the basis of the distribution of distortions and is equivalent to the contactors 1 to 5 in FIGURE 4. 21 is a strip stretched with a tension. 22 is a screw for feeding the measuring contactor 20 across the strip. 23 is motor to rotate the screw 22. 24 is a ball bearing. 25 is a rotatable supporter for supporting the above mentioned measuring part. 26 is a positioning system for adjusting the position of the measuring contactor. A lever 30 is fixed with a proper bending stress given by pulling up the measuring contactor 20 to the most suitable measuring position by rotating the rotatably fitted supporter 25 through a reduction gear 27. 28 is a wire strain gauge fixed to the above mentioned lever 30.

When the positioning system 26 is driven and rotated, the supporter 25 will rotate. Where the measuring contactor 20 has come to a proper height in contact with the strip 21, the motor 23 is rotated to rotate and drive the screw 22 so that the measuring contactor 20 may be reciprocated across the strip.

Thus, the load acting on the measuring contactor 20, that is, the tension distribution across the strip is measured with the wire strain gauge 28 given to the lever 30 carrying the measuring contactor. This also forms a flatness measuring instrument for the strip 21.

FIGURE 8 shows an example of measuring the flatness of a strip by using the present measuring instrument set on the outlet side of a skin pass mill for cold-rolled strip.

In the drawing, 41 is a strip being rolled under a tension. 42 is the above explained flatness measuring instrument stably and securely installed on a foundation 47. 48 is a foundation for said flatness measuring instrument. 43 is a bridle roll. 44 is a work roll of a skin pass mill. 45 is its back-up roll.

FIGURE 9 shows an example of measuring the tension distribution across a strip with the instrument and method in FIGURE 8. The numerical values on the abscissa represent the positions corresponding to the measuring contactors 1 to 5 in FIGURE 4. The ordinate shows the bending stress values of the strain gauge 9 pasted to the lever 10 of each of the contactors 1 to 5 in FIGURE 5 or the strain gauge 28 fixed to the lever 30 in FIGURE 7. The abscissa shows the measuring positions across the strip corresponding to the measuring contactors 1 to 5 in FIGURE 4.

That is to say, the measuring example in FIGURE 9 shows that the tension is low in the central part but is high on the edges of the strip and that therefore the strip being rolled is of center buckle. In the case of using such multi-roller type measuring instrument as is shown in FIGURES 4 and 5, in order to solve the problems of the horizontal fitting precision of the respective measuring contactors 1 to 5 and the measuring balance of the wire strain gauges 9 pasted to the respective levers 10, it is necessary to determine in advance by the experimental measurement the relation of the flatness of the strip with the distribution of the measured values. FIGURE 10 shows an example of the relation between the measured value and the flatness as obtained by making a sheet of the strip after the measurement and actually measuring the flatness of the sheet on a surface plate for this purpose.

FIGURE 10 shows that a strip having a favorable flatness can be obtained by designating the values subtracting the load in the central part 3 from the load on the both edges 1 and 5 as $T_1$ and $T_2$, respectively, comparing an average value of said two values, $$\frac{T_1 + T_2}{2} = T$$

with a previously designated standard value $T_0$ to obtain a value $T - T_0 = \Delta T$ which is to be a controlled input for a roll contour control system (FIG. 11) and maintaining constantly $T = T_0$. That is to say, it is desirable that the roller should always watch the measured value T of the flatness and carry out the rolling at the value of $T = T_0$. It is to be noted that the measuring contactors 2 and 4 in FIGURE 9 measure and plot to show clearly the condition of the flatness and they have no direct relation when determining the control amount.

Figure 11:
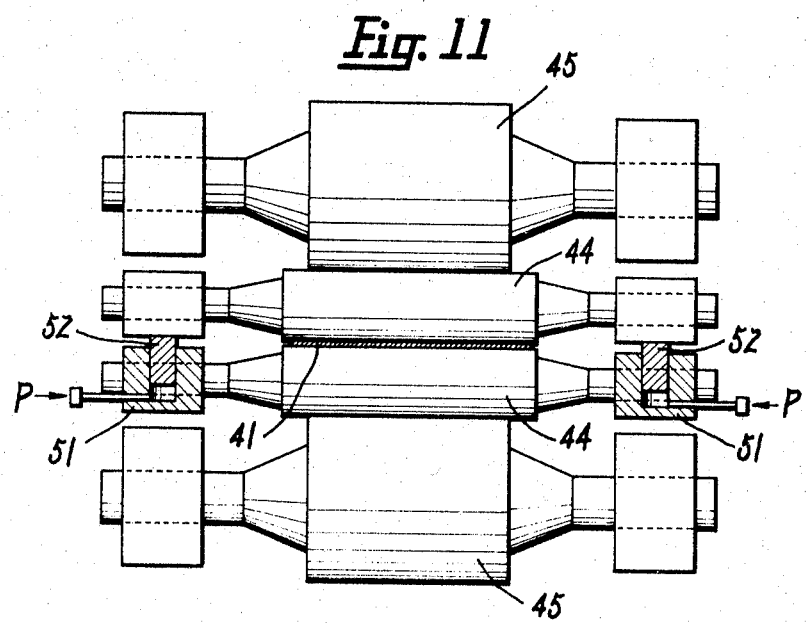
FIGURE 11 is a schematic view of a known instrument for varying the contours of rolls of a 4-high mill.

As a method for this purpose, in the case of a 4-high mill, as illustrated in FIGURE 11, oil pressure cylinders 52 and 52' are provided between the work roll metal chocks 51 and 51' of a roll so that a separating force may be fed by the oil pressure to vary the contours of the work rolls 44 and 44'.

Figure 12:
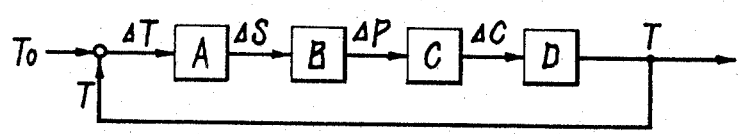
FIGURE 12 is a flow sheet showing a control system in automatically controlling the flatness of a strip with a combination of the flatness measuring instrument of the present invention and a known roll contour varying apparatus.

FIGURE 12 is a circuit diagram in the case of automatically controlling the shape of a strip being rolled by controlling the oil pressure P with the measured value T by using such work roll contour control system as is illustrated in FIGURE 11. $T_0$ is a standard value. T is an amount of deviation of the measured value shown in FIGURE 9. A is a servo mechanism. B is an oil pressure mechanism for the work roll contour control system. C is a contour of the work roll. D is a strip. By the deviation $\Delta T$ between the control standard value $T_0$ and the measured value T, the servo mechanism A will operate to vary the value of the oil pressure mechanism by $\Delta S$, therefore the oil pressure P of the work roll contour control system will vary greatly by $\Delta P$, the contour of the work roll will greatly vary by $\Delta C$ and this will become an input to correct the flatness of the strip D and will be fed back a measured amount T. By such a system, the flatness can be automatically controlled.

Experiments were made to catch the correlation between the measured value by the flatness measuring instrument and the actual waviness (or wave edges) of sheets. The flatness measuring instrument was set on the outlet side of a temper mill of a work roll diameter of 58 cm., a back-up roll diameter of 143 cm. and a roll barrel length of 143 cm. In tempering and rolling a strip of a thickness of 0.917 mm. and a width of 930 mm., it was rolled at such low speed as 50 m./min. for the experimental purpose, a strip in which the flatness was purposely varied was made by varying the reduction, the measured values by the measuring instrument in various states were recorded and at the same time the corresponding parts of the strip in which the measured values were recorded were marked. The marked parts were extracted while cutting the strip with a shear and the center buckle and wave edges were measured by the normal method on a surface plate.

Figure 13:
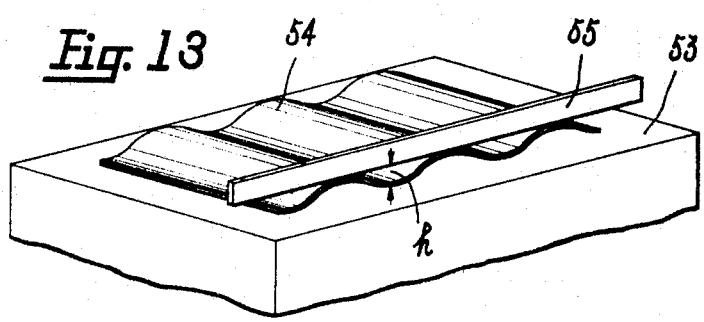
FIGURE 13 is a perspective view showing the state of measuring the height and the waviness of a strip.

As described above, in the measured values of the flatness in each stage, the value obtained by subtracting the value in the central part (the roller No. 3) from the average value at both ends was represented by T. As illustrated in FIGURE 13, and waviness height $h$ was measured by placing a sheet 54 on a surface plate 53 and applying a scale 55 to the sheet. In such case, the value obtained by subtracting the waviness height at both ends from the waviness height in the central part was considered.

In case said value was positive, it was of center buckles. In case it was negative, it was of wave edges.

A part of the experimental data shall be given in the following:

| Test No. | T | Flatness |
|---|---|---|
| 1 | −2.9 | −2.1 |
| 2 | +0.3 | 0 |
| 3 | +4.9 | 2.1 |
| 4 | −2.8 | −1.9 |
| 5 | −3.2 | −2.3 |
| 6 | 0 | −1.4 |
| 7 | −0.2 | −1.7 |
| 8 | +1.3 | 0 |

As there were errors in the measurement on the surface plate, the data fluctuate. However, the relation between the load deviation T and the waviness can be well seen.

What is claimed is:

1. A method of controlling the flatness of strip comprising the steps of guiding a strip under tension between at least two sets of fixed rollers, arranging contactors in a row, said contactors being always in contact with at least a center part and both edges across strip and fixed to a common shaft by levers, said common shaft being rotatable with a driving means to be able to control the contact pressure of said rollers with respect to the strip, measuring the lengthwise tension of the strip as a load on said contactors by electrically altering a deflection force of said lever comparing thus obtained tension (T) of the both edges with respect to the center part of the strip with a predetermined set standard value ($T_o$) so as to determine a deviation between said predetermined set standard value and said measured value, and correcting the roll contour by giving the value ($\Delta T$) of deviation as an input instruction for a roll contour control system.

2. A method of controlling the flatness of strip comprising the steps of guiding a strip under tension between at least two sets of fixed rollers, driving reciprocatably across the strip one contactor contacting always with said strip through a lever supporting said contactor, rotating said rollers together with the reciprocatably driving means to be able to control the contact pressure of said rollers with respect to the strip, measuring intermittently the lengthwise tension on the center part and both edges of the strip as a load on said contactors by altering electrically the deflection force of said lever, comparing thus obtained tension (T) of the both edges with respect to the center part of the strip with a predetermined set standard value ($T_o$) so as to determine a deviation between said predetermined set standard value and said measured value, and correcting the roll contour by giving said value ($\Delta T$) of deviation as an input instruction for a roll contour control system.

3. An instrument for measuring the flatness of strips comprising at least two sets of fixed rollers, between the rollers of which a strip under tension being guided, contactors arranged in a row across said strip to contact always with at least the center part and both edges of the strip, each of said contactors being fixed to a common shaft through a lever, said common shaft being rotatable with a driving means to be able to control the contact pressure of said rollers with respect to the strip and means for measuring the lengthwise tension of the strip as a load on said contactors by electrically altering a deflection force of said lever to compare thus obtained tension deviation (T) of the both edges with respect to the center part of the strip with a predetermined set standard value ($T_o$) thereby determining a deviation between said predetermined set standard value and said measured value and correcting the roll contour by giving the value ($\Delta T$) of deviation as an input instruction for a roll contour control system.

4. An instrument for measuring the flatness of strips comprising at least two sets of fixed rollers, between the rollers of which a strip under tension being guided, a plurality of contactors, one of said contactors being reciprocatably driven across the strip through a lever supporting said one contactor to contact always said one contactor with said strip and to rotate said contactor together with a reciprocatably driving means so as to be able to control the contact pressure of said roller with respect to the strip, and means for measuring intermittently the lengthwise tension on the center part and both edges of the strip by electrically altering a deflection force of said lever to compare thus obtained tension deviation (T) of the both edges with respect to the center part of the strip with a predetermined set standard value ($T_o$) thereby determining a deviation between said predetermined set standard value and said measured value and correcting the roll contour by giving the value ($\Delta T$) of deviation as an input instruction for a roll contour control system.

References Cited

UNITED STATES PATENTS

| | | | |
|---|---|---|---|
| 2,674,127 | 4/1954 | Garrett et al. | 73—144 XR |
| 2,809,519 | 10/1957 | Kaestner | 73—144 XR |
| 3,016,460 | 1/1962 | Andresen | 73—150 XR |
| 3,228,219 | 1/1966 | Fox | 72—16 |
| 3,245,241 | 4/1966 | Roberts | 72—9 |

FOREIGN PATENTS

| | | |
|---|---|---|
| 820,799 | 9/1959 | Great Britain. |
| 891,232 | 3/1962 | Great Britain. |

CHARLES W. LANHAM, *Primary Examiner.*

A. RUDERMAN, *Assistant Examiner.*

U.S. Cl. X.R.

72—12, 17; 73—144